C. C. STUTZ.
MANUFACTURE OF GLASS ARTICLES.
APPLICATION FILED JUNE 12, 1911.
1,007,156.
Patented Oct. 31, 1911.
14 SHEETS—SHEET 1.
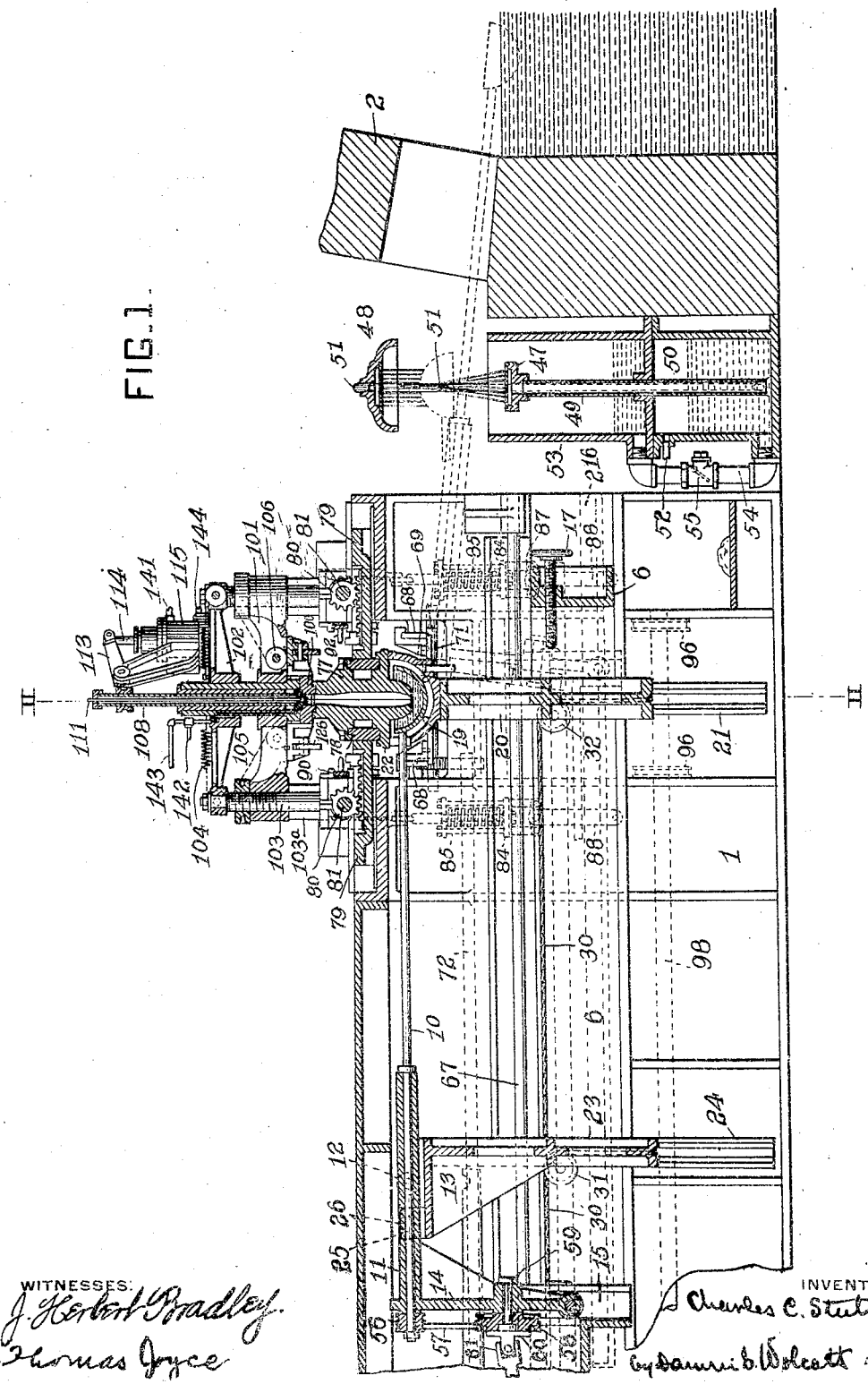

C. C. STUTZ.
MANUFACTURE OF GLASS ARTICLES.
APPLICATION FILED JUNE 12, 1911.

1,007,156.

Patented Oct. 31, 1911.
14 SHEETS—SHEET 2.

WITNESSES:
J. Herbert Bradley
Thomas Joyce

INVENTOR
Charles C. Stutz
by Dominick Wolcott
Atty

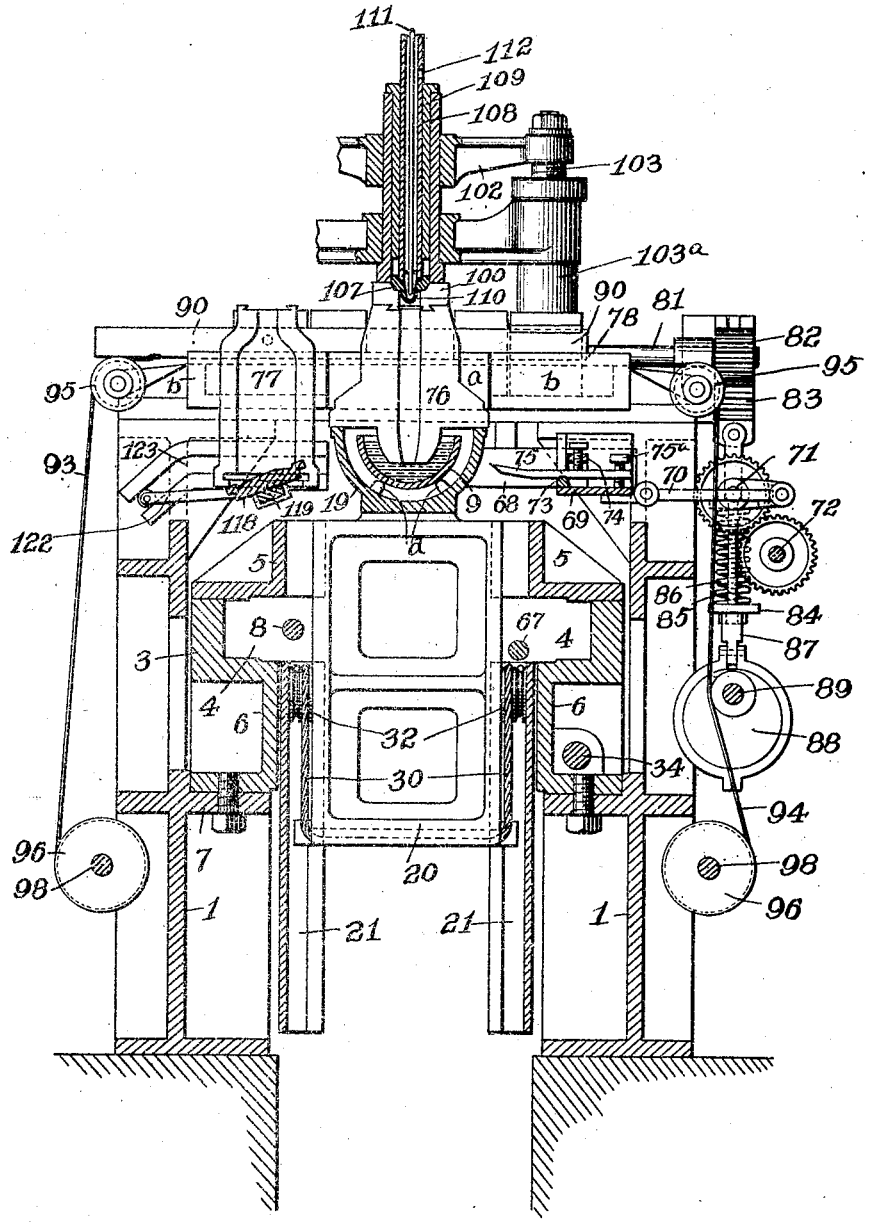

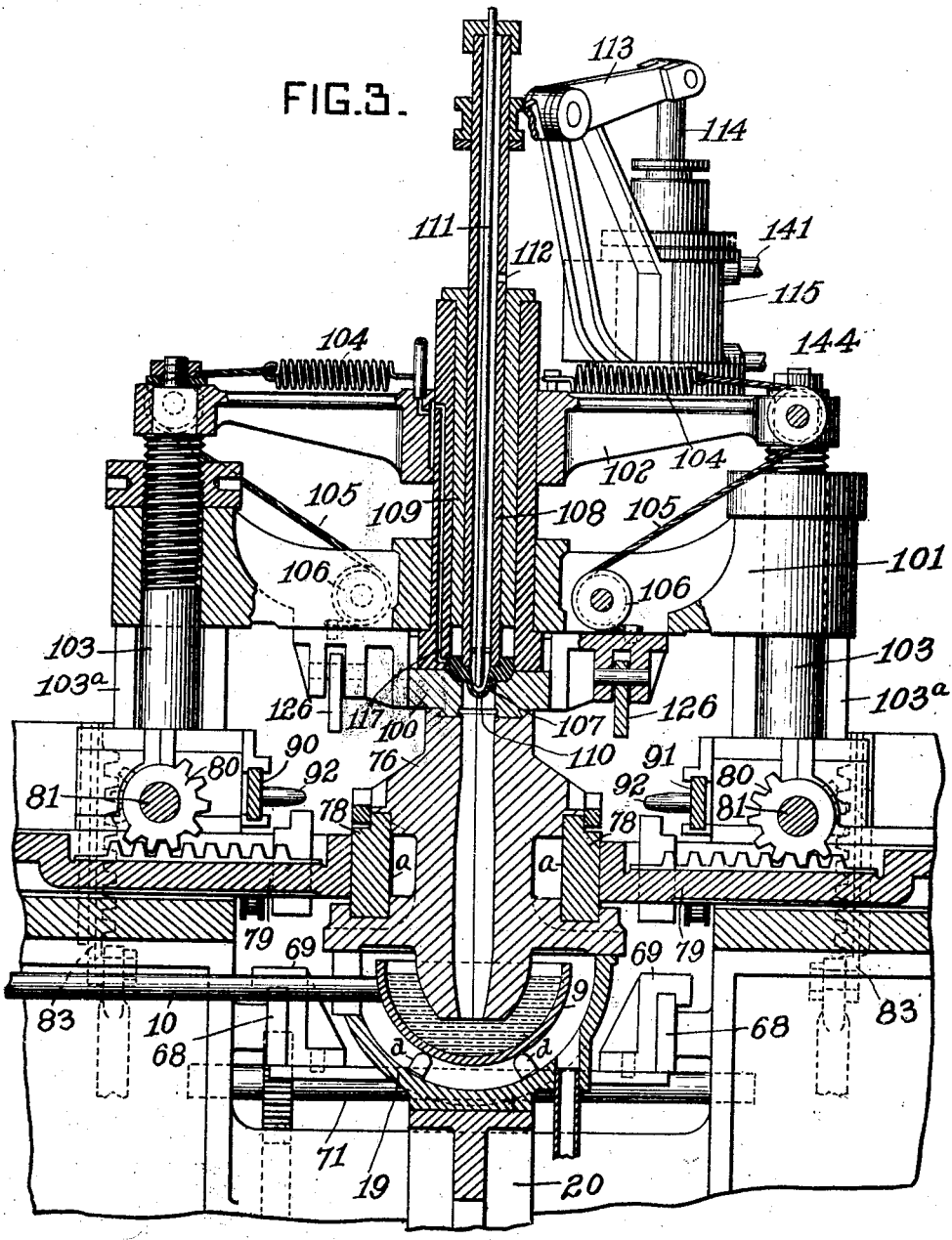

C. C. STUTZ.
MANUFACTURE OF GLASS ARTICLES.
APPLICATION FILED JUNE 12, 1911.

1,007,156.

Patented Oct. 31, 1911.
14 SHEETS—SHEET 5.

WITNESSES
J. Herbert Bradley
Thomas Joyce

INVENTOR
Charles C. Stutz
by Daniel B. Wolcott
Atty

C. C. STUTZ.
MANUFACTURE OF GLASS ARTICLES.
APPLICATION FILED JUNE 12, 1911.
1,007,156.
Patented Oct. 31, 1911.
14 SHEETS—SHEET 6.
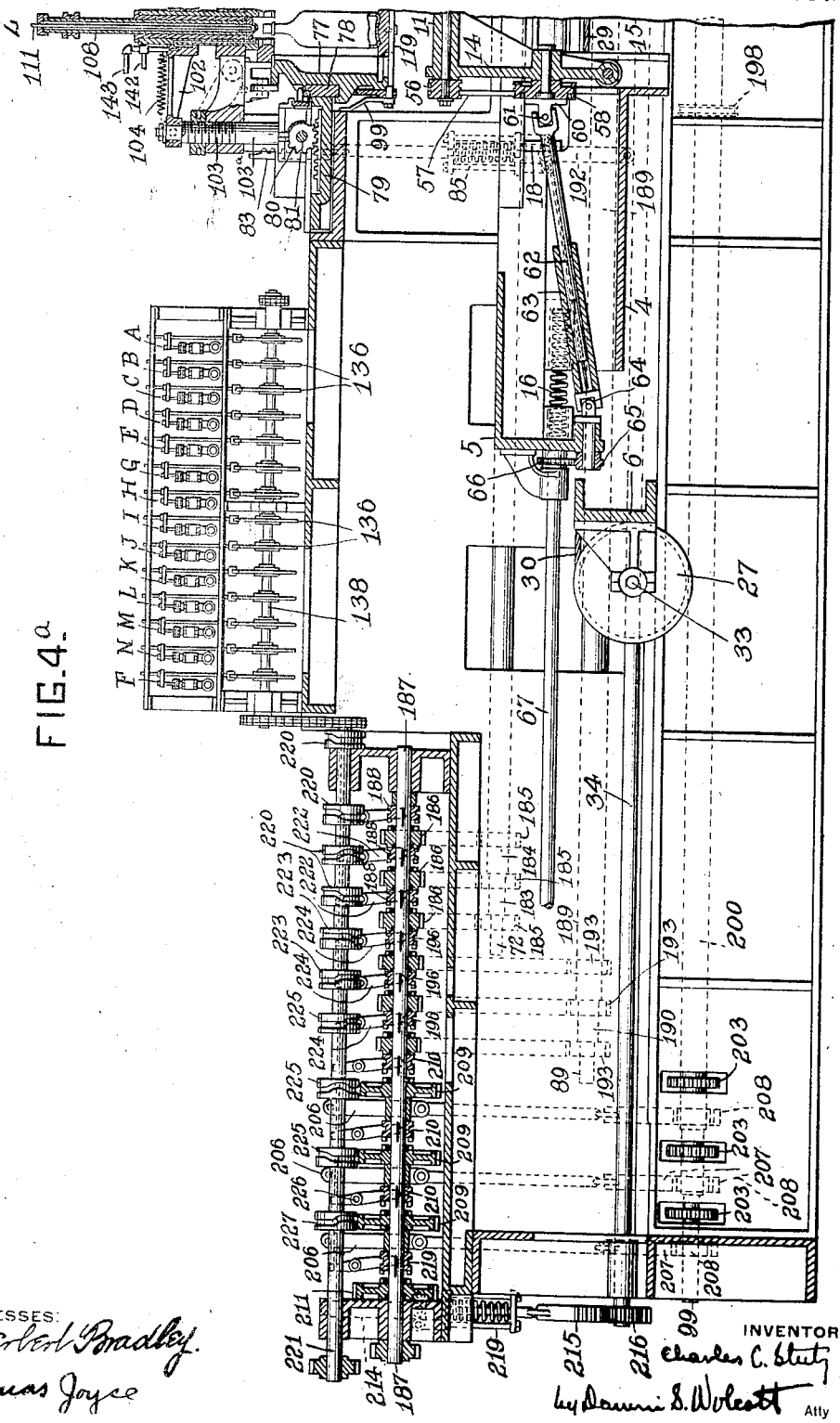
FIG. 4ª.
WITNESSES:
J. Herbert Bradley.
Thomas Joyce
INVENTOR
Charles C. Stutz
by Dennis S. Wolcott
Atty

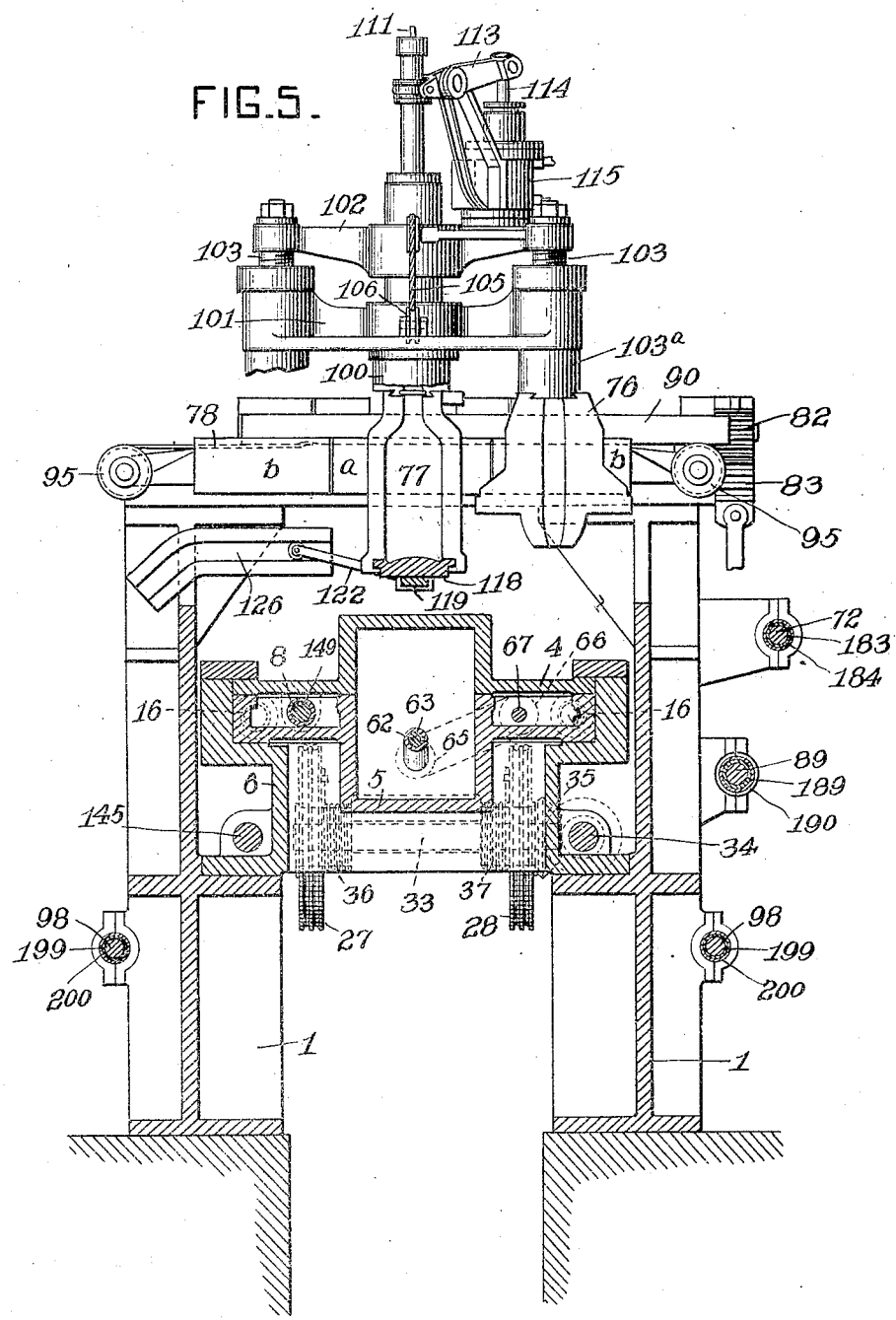

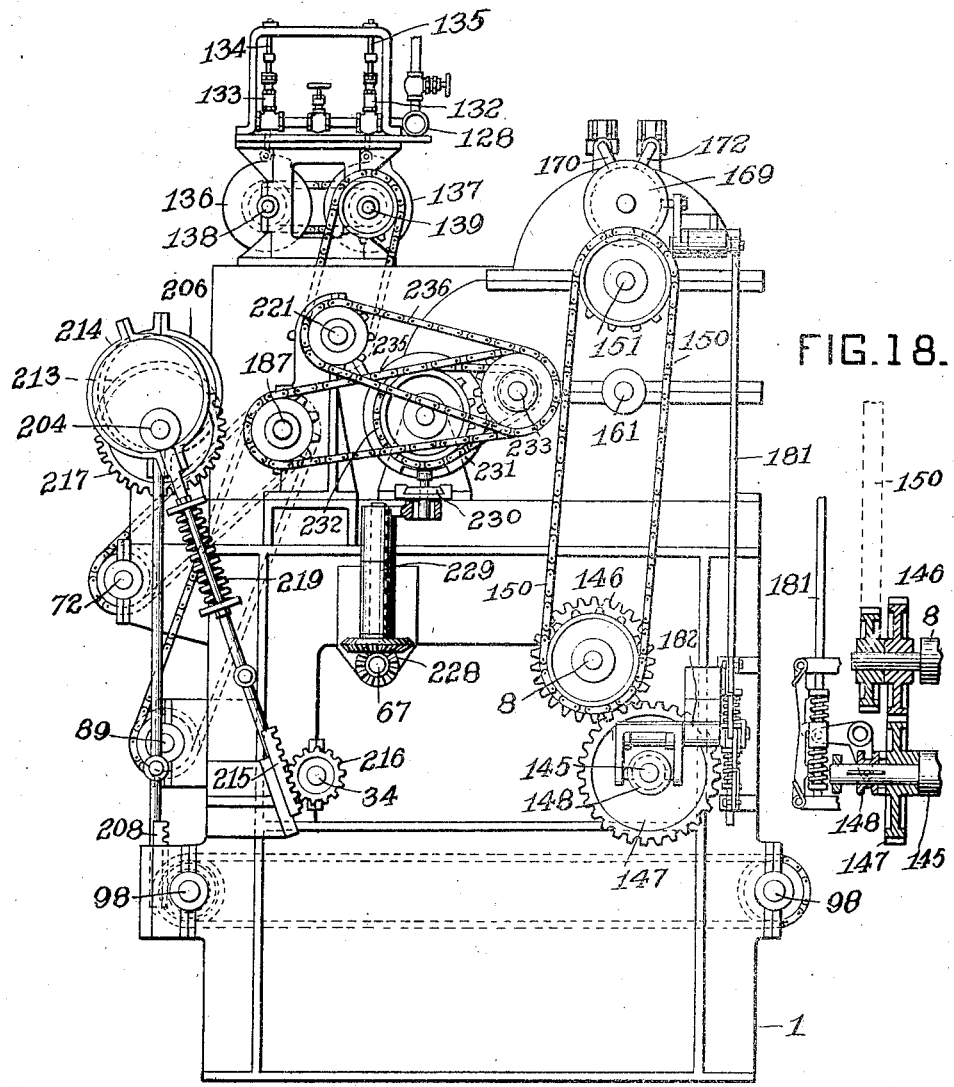

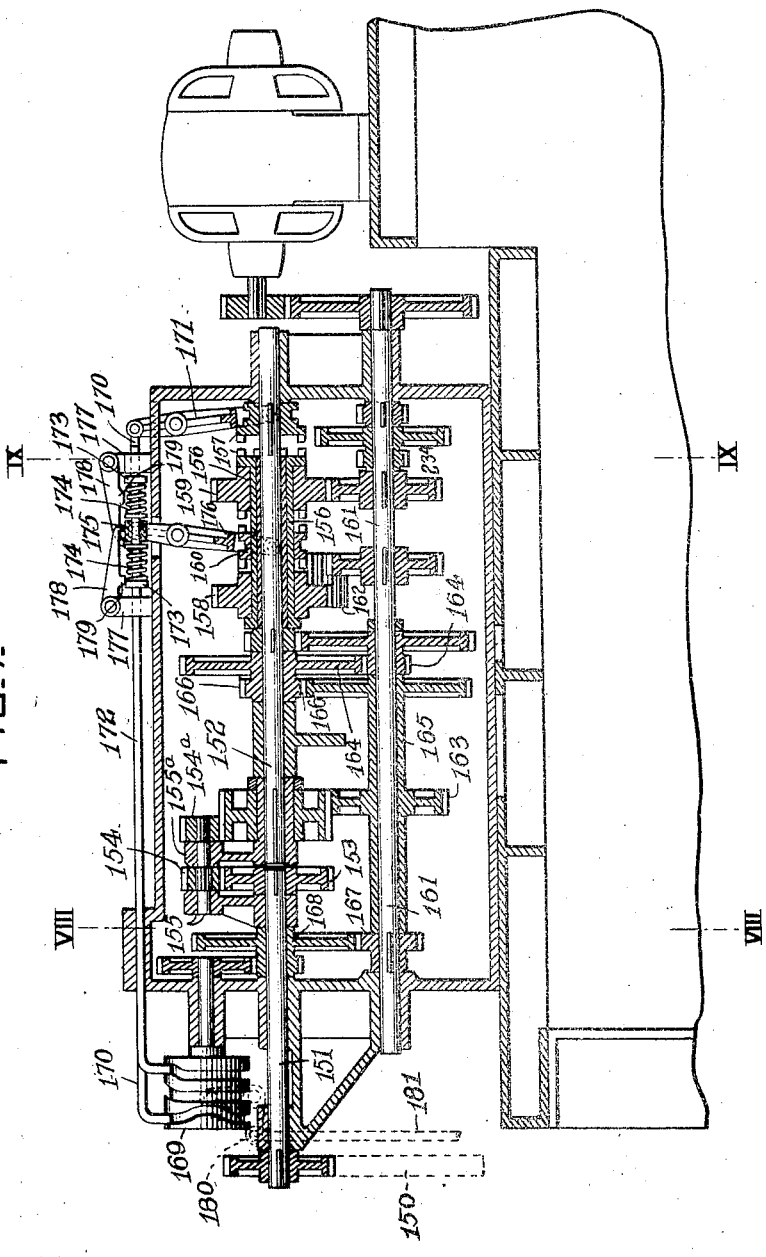

C. C. STUTZ.
MANUFACTURE OF GLASS ARTICLES.
APPLICATION FILED JUNE 12, 1911.

1,007,156.

Patented Oct. 31, 1911.
14 SHEETS—SHEET 10.

WITNESSES:
J. Herbert Bradley
Thomas Joyce

INVENTOR
Charles C. Stutz
by Dominick Wolcott
Atty

C. C. STUTZ.
MANUFACTURE OF GLASS ARTICLES.
APPLICATION FILED JUNE 12, 1911.

1,007,156.

Patented Oct. 31, 1911.
14 SHEETS—SHEET 11.

WITNESSES:
J. Herbert Bradley.
Thomas Joyce

INVENTOR
Charles C. Stutz
by Darwin B. Wolcott Atty

C. C. STUTZ.
MANUFACTURE OF GLASS ARTICLES.
APPLICATION FILED JUNE 12, 1911.

1,007,156.

Patented Oct. 31, 1911.
14 SHEETS—SHEET 13.

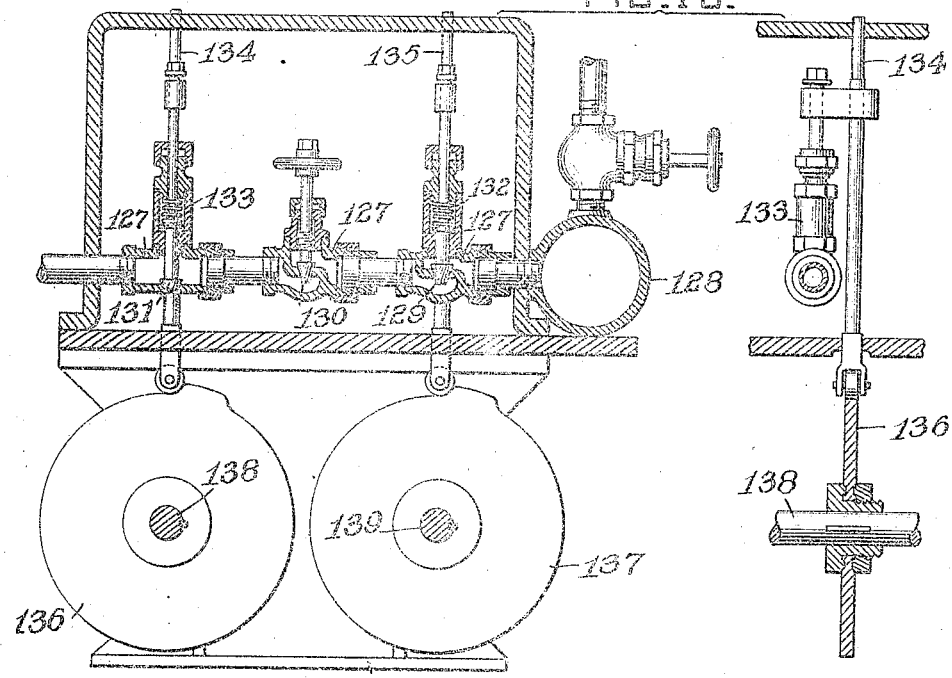
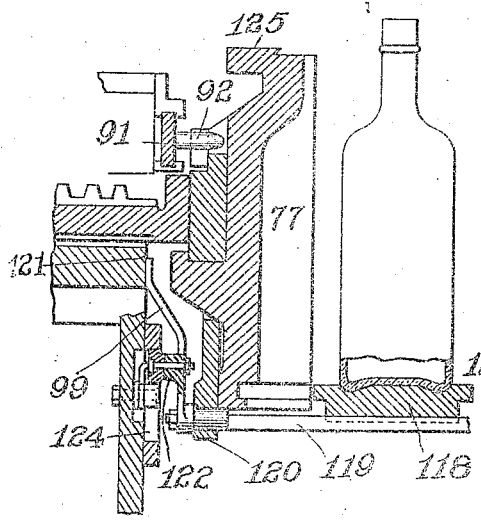
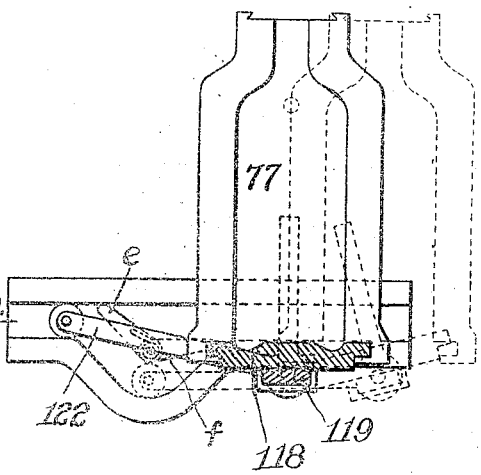

UNITED STATES PATENT OFFICE.

CHARLES C. STUTZ, OF NORWOOD, OHIO.

MANUFACTURE OF GLASS ARTICLES.

1,007,156.   Specification of Letters Patent.   Patented Oct. 31, 1911.

Application filed June 12, 1911. Serial No. 632,735.

*To all whom it may concern:*

Be it known that I, CHARLES C. STUTZ, residing at Norwood, in the county of Hamilton and State of Ohio, citizen of the United States, have invented or discovered certain new and useful Improvements in Manufacture of Glass Articles, of which improvement the following is a specification.

The invention described herein has for its object the automatic transfer from a furnace or molten body of glass of a sufficient quantity to form an article such as a bottle, forcing the glass so transferred into a shaping mold, removing such primary mold from the shaped mass or blank, inclosing the latter in finishing mold, and causing the blank to conform to such finishing mold.

The invention is hereinafter more fully described and claimed.

Figure 1A:
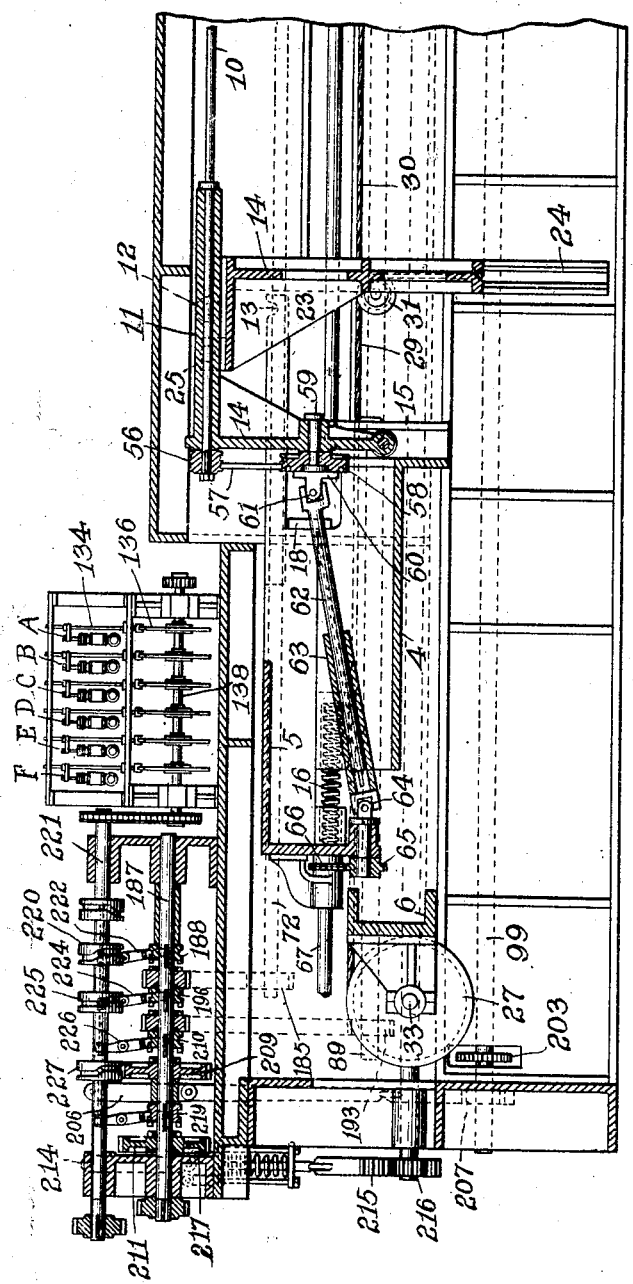
Figure 4:
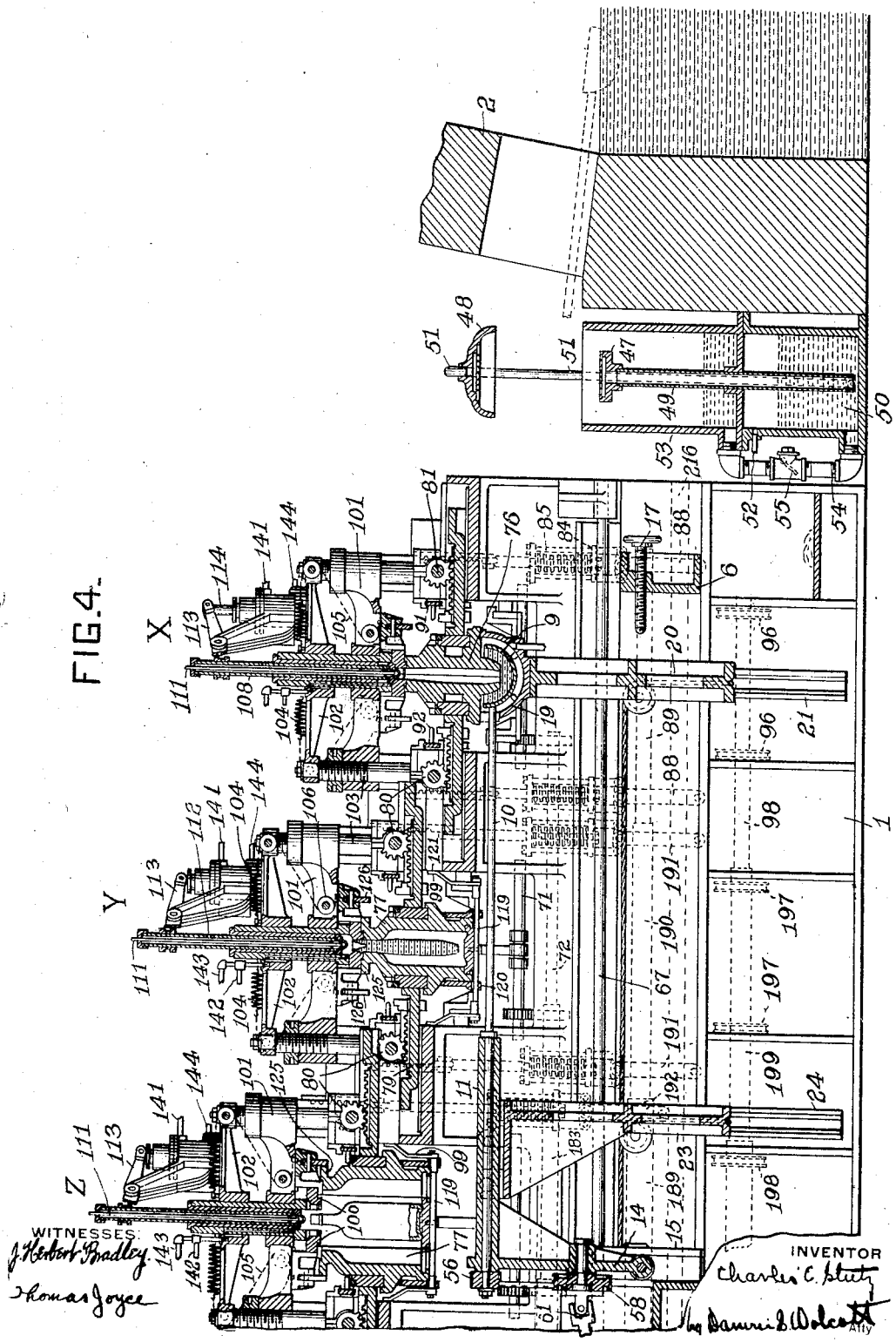
Figure 8:
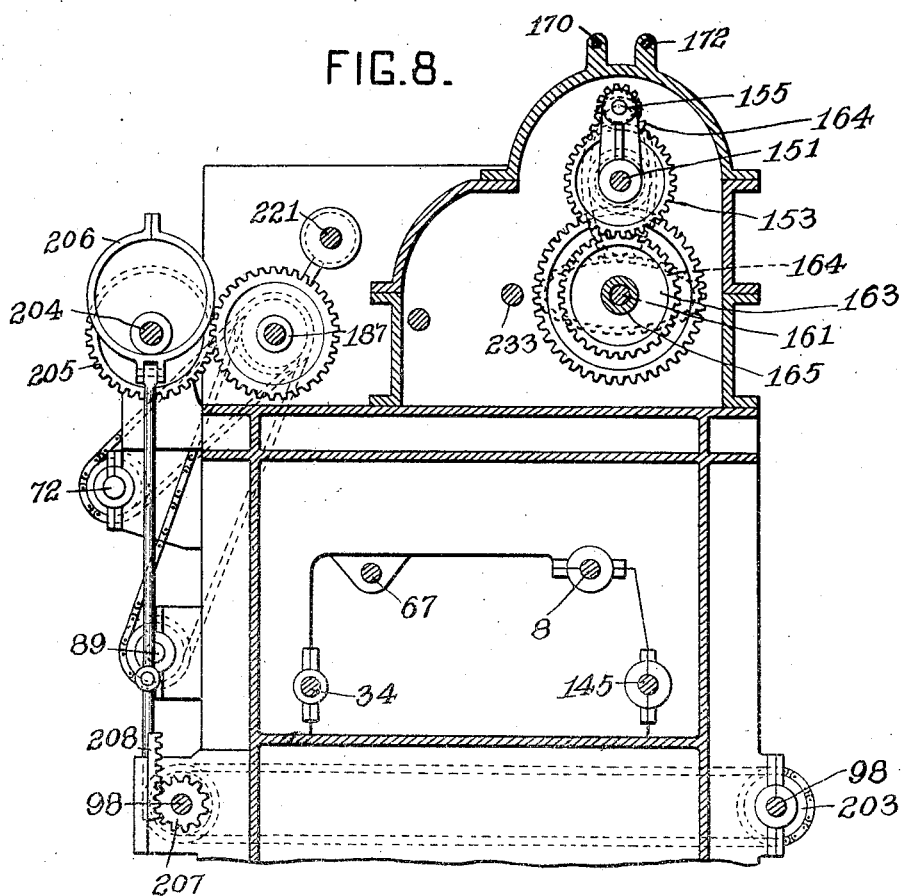
Figure 9:
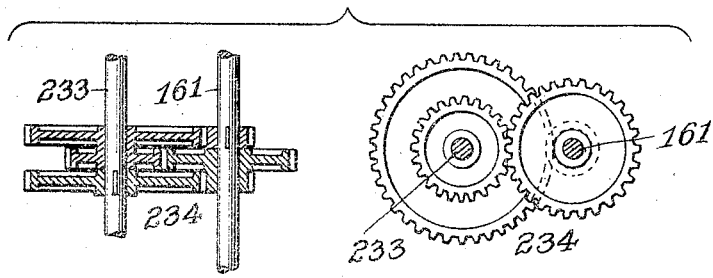
Figure 10:
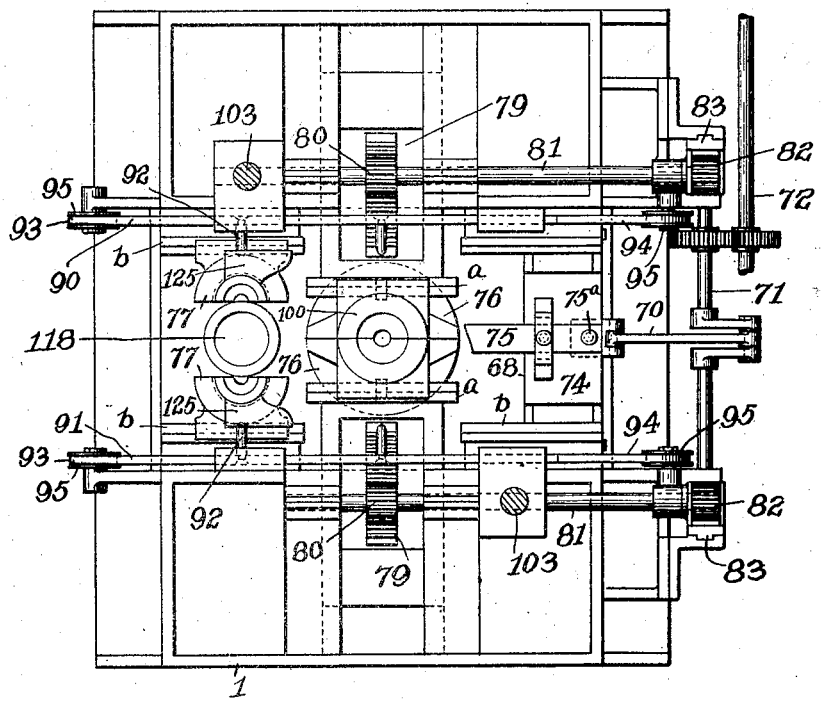
Figure 11:
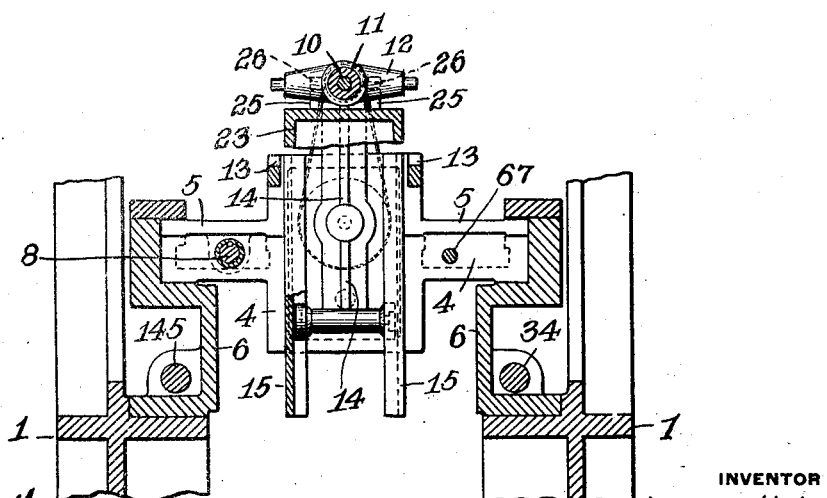
Figure 12:
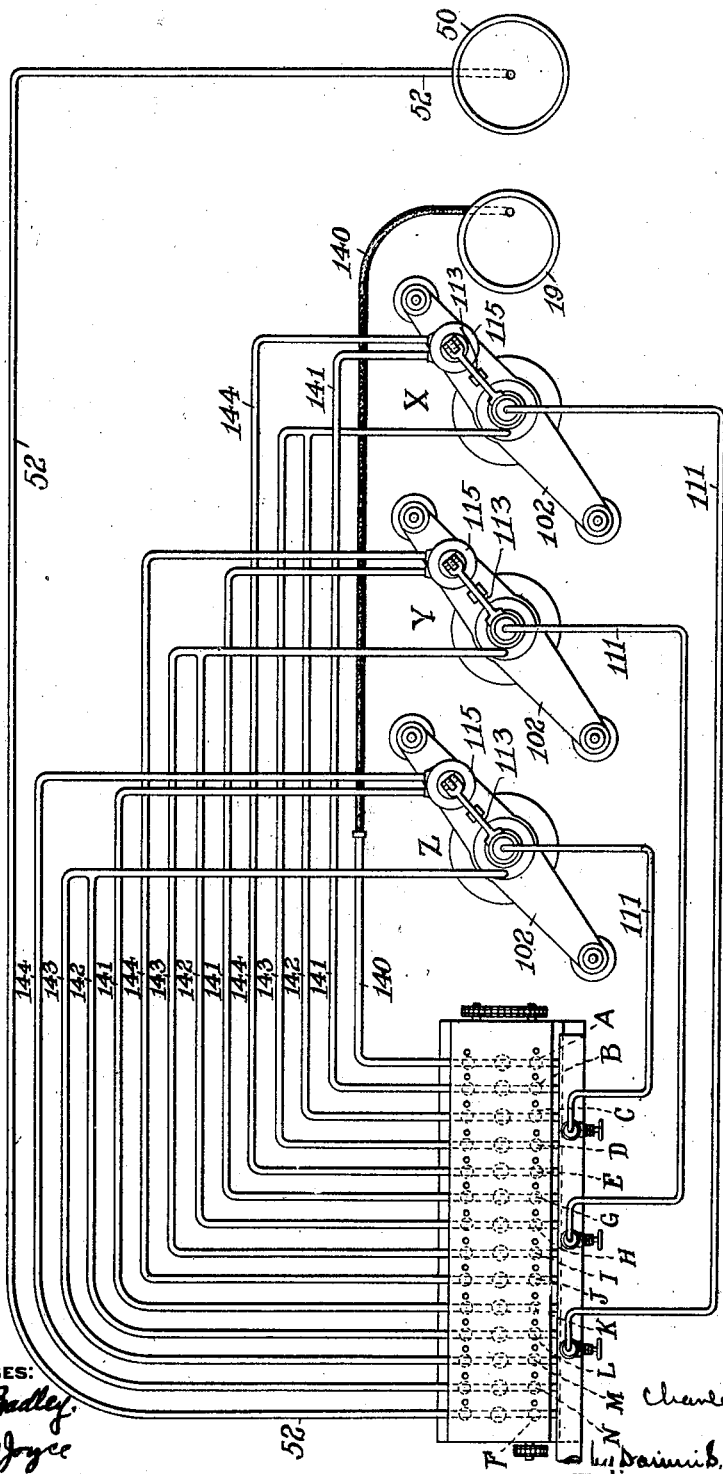
Figure 13:
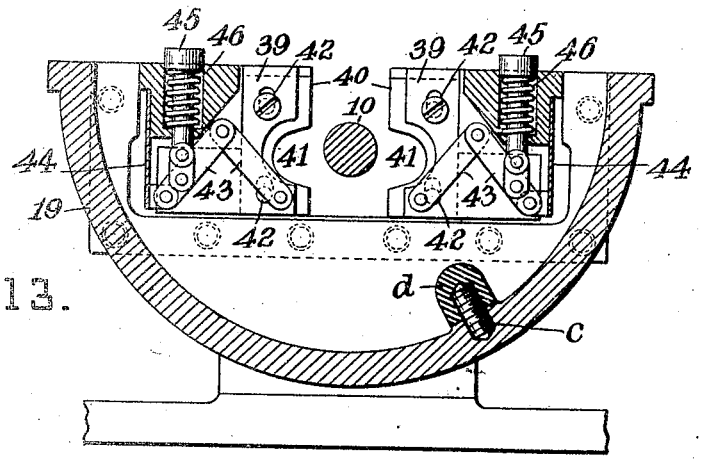
Figure 14:
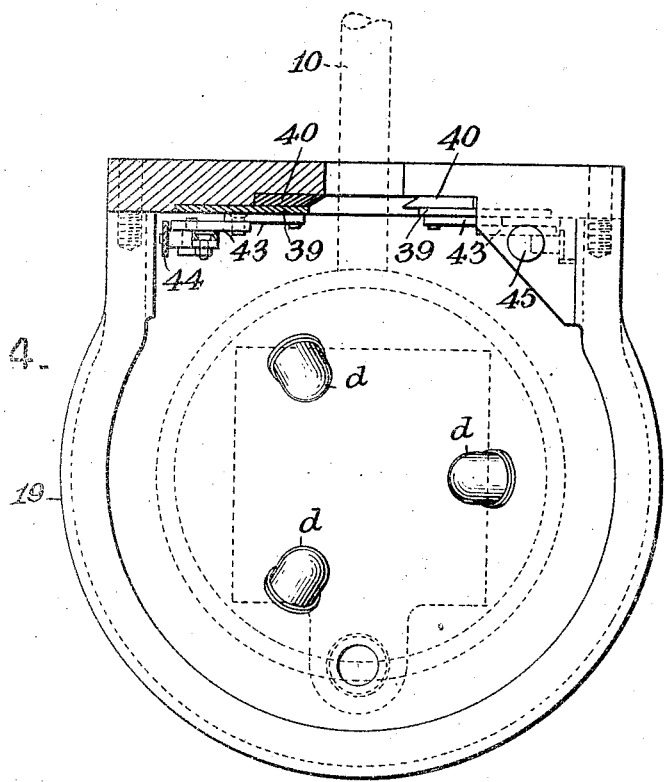

In the accompanying drawings forming a part of this specification, Figures 1 and 1ª (Sheets 1 and 2) are sectional elevations of my single unit machine, Fig. 2 is a transverse section on a plane indicated by the line II—II Fig. 1; Fig. 3 is a sectional elevation on an enlarged scale of the upper portion of Fig. 1; Figs. 4 and 4ª are sectional elevations illustrating my multiple-unit machine; Fig. 5 is a view partly in elevation and partly in section, the section being on a plane indicated by the line V—V Fig. 4; Fig. 6 is a rear end elevation of the multiple unit machine; Fig. 7 is a sectional detail view showing the main drive shaft and mechanism for transmitting power from the main drive shaft to the elements employed for reciprocating the frame and slides; Fig. 8 is a sectional elevation on planes indicated by the lines VIII—VIII Figs. 4ª and 7; Fig. 9 shows at the right a transverse section on a plane indicated by the line IX—IX Fig. 7 and at the left a horizontal section of the gears shown at the right; Fig. 10 is a top plan view of the blank and blow molds and their connections in the single unit machine, the parts above the mold being omitted; Fig. 11 is a sectional detail view showing the vertical slide for the ladle sleeve and the means for tipping such sleeve; Fig. 12 is a diagrammatic top plan view showing the arrangement of the pipes from the valve mechanism to the parts operated by fluid pressure; Figs. 13 and 14 are horizontal and vertical sections of the bowl employed for lifting the ladle; Fig. 15 is an enlarged section of one of the valve mechanisms and Figs. 16 and 17 are a detail view illustrating a modification of the means employed for tilting the bottom of the blow mold, and Fig. 18 is a sectional detail view of the transmitting gearing shown at lower right hand portion of Fig. 6.

In the practice of my invention the bedplate 1 is arranged on suitable foundations in line with a gathering opening in the furnace 2, which is preferably of the tank type. The bedplate is provided with guide ways 3 for the slides 4 and 5, said guideways being preferably formed on a frame 6, which is supported by ledges 7 integral with the bedplate and may be held stationary by bolts as shown in Fig. 2, or may be movable as hereinafter described. The upper slide 5 is reciprocated back and forth for transferring a suitable quantity of glass from the furnace to the blank mold, by any suitable means preferably by a screw 8 engaging a threaded opening in the slide. The ladle 9 is carried by a rod 10 which is rotatably and movably mounted in a sleeve 11 as shown in Fig. 1. This sleeve, which is provided with trunnions 12 adapted to be normally supported in notches 13 in the slide 5, has at its rear end an angularly arranged arm 14 extending down into a vertically arranged guide 15 in the lower slide 4. The sleeve 11 being normally pivotally supported on the upper slide, the guide 15 with which the arm 14 engages, will serve to hold the sleeve and ladle rod in a horizontal position and will also shift the sleeve and arm to angular position to immerse the ladle into the molten metal, as hereinafter described. The lower slide 5, which as stated carries the tipping guide 15, is caused to move forward with the upper slide by means of springs 16 interposed between suitable abutments on the respective slides. The two slides are moved forward by the screw 8, the upper slide carrying the ladle. As shown in Figs. 1 and 1ª the sleeve and rod carrying the ladle are in a horizontal position during the first portion of the forward movement, but as soon as the ladle has entered the furnace the movement of the lower slide is arrested by the adjustable stop 17, the upper slide continuing its movement compressing the springs 16. The stopping of the lower slide and with it the movement of the lower end of the arm 14, while the upper slide continues its movement, will cause a tilting of the sleeve 11 and rod 10 to an angular position as shown by the dotted lines in Figs. 1 and 4, the ladle being dipped into the molten metal.

The ladle is in an inverted position when immersed in the glass, but the position of the ladle is reversed as soon as it has entered the glass, such reversal being effected by a rotation of the rod 10 as will be hereinafter described. As soon as the ladle has been turned to containing position, the upper slide is moved back by a reversal of the screw 8. During the first part of the rearward movement, the sleeve and ladle rod are shifted to a horizontal position, the lower end of the arm 14 sliding down the guide 15 in the lower slide 4. At this time a lug 18 in the upper slide engages the lower slide and thereafter the slides move back in unison until the ladle reaches a position under a blank mold. The lower end of the blank mold is next immersed in the glass contained in the ladle preferably by raising the ladle. To this end a bowl 19, which is carried by a slide 20 vertically movable in guides 21 arranged in the frame 6 in line with the blank mold, is raised to inclose and lift the ladle until the lower open end of the blank mold is immersed to a sufficient depth in the molten metal contained in the ladle. When thus raised the edge of the bowl forms a practically tight joint with a horizontal surface, which is preferably formed by a flange 22 on the blank mold. In order to prevent any springing or straining of the parts, it is preferred to lift the sleeve 11 and rod 10 with the ladle, and for this purpose a second slide 23 vertically movable in guides 24, is provided, said guides being arranged on the frame 6 parallel with the guides 21. This slide is provided with brackets having notched lugs 25 for the reception of laterally projecting pins 26 on the sleeve 11 as clearly shown in Fig. 1. The slides 20 and 23 are operated simultaneously by suitable mechanism such for example as that shown, consisting of drums 27 and 28 having wire ropes or metal bands 29 and 30 wound on their peripheries. Said ropes or bands pass forward over the guide pulleys 31 and 32 and are connected to the respective slides. The drums are loosely mounted on a shaft 33 mounted on suitable bearings at or adjacent to the rear end of the frame 6, and are rotated back and forth by a shaft 34 through bevel gears 35 as shown in Fig. 5. Although loosely mounted on the shaft 33 the drums are operatively connected thereto, by springs 36 and 37 so that the edge of the bowl 19 may be yieldingly held in contact with the surface of the flange 22.

In order to form a tight joint around the ladle rod 10, which extends through one side of the bowl, sliding plates 39 are mounted on opposite sides of the notch formed in the side of the bowl for the reception of the rod 10 as shown in Figs. 13 and 14. These slides are provided with jaws 40 having adjacent edges oppositely beveled so that they may overlap when pushed together. In the bevel edges are formed notches 41 adapted to closely bear against the rod 10, when closed against the same. The jaws are connected to the slides by rivets 42, the openings for the rivets in the slides or jaws being vertically elongated to permit the jaws to move and accommodate themselves to irregularities in the position of the rod. The notches 41 are flaring at their open ends to insure their passing onto the rod. Suitable means are employed to automatically close the jaws around the rod. A convenient means to that end consists of two pairs of pivotally connected links 43, one link of each pair being connected to one of the slides, while the other link is connected to a spring or yielding abutment 44. One of each pair of links is connected to a vertically arranged pin 45 extending above the edge of the bowl, in which position it is held by a spring 46. The several parts are so arranged that in the upward movement of the pins, the slides and jaws will be drawn apart. When the bowl is raised as before described, to inclose the ladle, the pins 45 will bear against and be forced down by the flange 22, thereby forcing the slide and jaws inwardly, the latter tightly inclosing the rod 10.

The ladle is supported in the bowl by a plurality of studs consisting of threaded pins c screwed into the wall of the bowl, and cap shaped blocks d screwing into the inner ends of the pins. This construction permits of the easy regulation of the position of the ladle in the bowl and consequently of the depth to which the lower end of the blank mold shall be immersed in the glass. The bowl is also provided with suitable means for connection with a fluid pressure supply, whereby glass may be forced from the ladle into the blank molds.

After glass has been forced into the blank mold, the slides 20 and 23 are lowered so that the sleeve 11, rod 10 and the ladle will be supported by the slide 5, the trunnions 12 entering the notches 13 in the slide. The latter is then moved forward toward the furnace and during such forward movement the rod 10 is turned to invert the ladle to discharge any surplus glass. Suitable means are provided for suddenly cooling any glass which may adhere to the ladle and the ladle itself, such cooling causing the glass to crack and drop off of the ladle. In Fig. 1 is shown a form of apparatus for such cooling consisting of two oppositely arranged spraying nozzles 47 and 48, so supported that the inverted ladle will pass between them as it is moved toward the furnace. The lower nozzle 47 is supported by a pipe 49 extending down into a tank 50 and the nozzle 48 is supported by a second pipe 51 also extending into the tank, which is connected by a pipe 52 to a suitable source of air under pressure. By means of suitable automatic valve mechanism which will be hereinafter described, air under pressure is admitted to the tank thereby forcing water or other suitable liquid against the upper and lower sides of the ladle while moving toward the furnace. It is preferred to provide a basin or tank 53 under the nozzles to catch the fluid. This catch basin is connected to the supply tank 50 by a pipe 54 provided with a check valve 55 to prevent of the escape of fluid pressure from the tank 50.

While any suitable means may be employed for turning the ladle as it moves toward the furnace to discharge any surplus and to scoop up a quantity of glass while in the furnace, the construction shown in Figs. 1 and 1ª, is believed to be well adapted for the purpose. On the rear end of the rod 10 is secured a drum 56 to which are attached two straps 57 passing in opposite directions to a second drum 58 loosely mounted on the stud 59 secured to the arm 14. A disk 60 is secured to the drum and is connected by a universal joint 61 to one member of a telescopic shaft consisting of a rod 62 and a sleeve 63 keyed one to the other so as to rotate in unison but to move longitudinally independently one of the other. The sleeve 63 is connected by a universal joint 64 to a short shaft mounted in the rear end of the upper slide 5. A sprocket wheel 65 on this shaft is operatively connected by a chain to a corresponding wheel 66 so mounted on the shaft 67 which extends the full length of the machine, as to be rotated thereby and movable along the same by the slide 5.

Provision is made for severing the glass forced into the blank mold from any surplus that may remain in the ladle. Rails 68 are secured to the side plates of the machine in a suitable relation to the blank mold, and on these rails is mounted the knife carriage 69, connected by the link 70 to a crank arm preferably secured on the countershaft 71 which is driven at suitable intervals by the shaft 72 as shown in Figs. 1, 2 and 3. The carriage is provided with an abutment 73 and a strap 74 through the top of which passes a set screw. The blade 75 which is provided at its rear end with an adjusting screw 75ª, is passed under the strap and over the abutment which serves as a pivotal support for the blade. By means of the screws the front end of the blade can be closely adjusted so that when the carriage is reciprocated the blade will move along in contact with the lower end of the blank mold making a clean cut through the glass. As will be readily seen by reference to Fig. 2 the blade can be easily removed by loosening the screw in the strap 74.

The blank mold 76 and blow mold 77 are formed in two vertical sections, which are movably mounted on rails 78 arranged above and at right angles to the direction of movement of the ladle. Each rail consists of stationary end section b and laterally movable middle sections a as shown in Figs. 1, 2, 3 and 10. The middle sections a of the rails, which are directly above the basin 19, are attached to slides 79 movable in opposite directions but parallel with the direction of movement of the ladle. These slides may be shifted by any suitable means, as for example pinions 80 intermeshing with the teeth on the slides, said pinions being secured on the shafts 81 to which are secured pinions 82 intermeshing with racks 83. These racks have their lower ends attached to movable plates 84 mounted on rods 85 and are held in normal positions by springs 86. The lower ends of the rods are connected by cross heads 87 to the straps of eccentrics 88 in the shaft 89 as shown in Fig. 2. The end sections b of the rails are arranged a distance apart proportional to the desired separation of the mold sections necessary for removing the mold sections from around the blank and finished article respectively as shown in Figs. 3 and 10. As the formation of the blank and the blowing of the latter are effected while the respective molds are carried by the movable rail sections a, provision is made for shifting one mold from and the other mold onto said rail sections. The movements are preferably effected simultaneously, and while any suitable means may be employed for that purpose the construction shown in Figs. 1, 2, 3 and 10, is well adapted therefor. Sliding bars 90 and 91 are mounted on any suitable bearings paralleled with the rails 78, and are so arranged relative to the opening movement of the mold sections, that when the latter are moved outwardly by the slides 79, they will engage the bars 90 and 91 in any suitable manner, and when so engaged the sections of the blank mold will be tied to the corresponding sections of the blow mold. This engagement may be effected by pins 92 on the bars or tie rods entering holes formed in the molds as shown. Bands 93 and 94 are connected to the ends of these bars or tie rods and extend over guide pulleys 95 to drums 96 on the shafts 98 as shown in Fig. 2. By oppositely rotating these shafts, the molds can be shifted, one from and the other into operative position and by reversing the shafts the positions of the molds can be changed.

The neck mold 100 is formed in two sections which are so mounted in guides on the under side of the lower bridge 101, as to be movable toward and from each other as hereinafter described. The bridge 101 as also the upper bridge 102, are supported on uprights 103, the lower bridge which carries the neck mold being adjustable on the uprights so as to permit of the use of molds of different heights. The neck molds are normally held in closed position by springs 104 connected to the respective mold sections by bands or cords 105, which pass over guide pulleys 106 as shown in Figs. 1 and 3. As shown, the lower portions of the neck molds are engaged by both the blank and blow molds, and are thereby held in closed position during the formation of the blank and the blowing of the latter. The upper end of the opening of the neck mold is closed by the plug 107 on the lower end of the hollow plunger 108 which is guided in its movement by sleeves 109 carried by the upper and lower bridges. The lower end of the plug is provided with a teat 110 for forming an initial opening in the upper end of the blank. The plug, plunger, etc. are kept cool by a fluid entering through the pipe 111 and escaping through a port 112.

The plunger is connected by a lever 113 to the piston rod 114 of a fluid pressure cylinder 115 carried by the upper bridge 102. After the formation of the blank the sections of the mold are separated by shifting the intermediate sections $a$ of the rails 78 outwardly into line with the stationary end sections $b$, on one of which the blow mold sections are carried. This separation of the blank mold sections leaves the blank suspended from the neck mold in the same position in which it was formed. When the blank mold sections are moved outwardly they engage one end of the bars 90 and 91, the opposite ends of which are at that time in engagement with the blow mold sections. The shafts 98 are now operated to shift the blank mold from and the blow mold onto the movable rail sections $a$ which are then moved inwardly closing the blow mold sections around the blank, the lower portion of the neck mold and the bottom of the mold. While the blank is suspended from the neck mold, it is preferred that a sufficient puff of air be admitted into the lower end of the tubular guide 109 through a port 117 to enlarge the initial opening formed in the upper end of the blank by the teat 110, the plunger having been raised at about the time the blank mold sections were separated by the admission of fluid pressure into the cylinder 115, to uncover the port 117 and permit the air to enter the neck mold. The bottom 118 of the blow mold is carried by a bar 119 slidably supported in lugs 120 attached to the mold sections as shown in Figs. 16 and 17. In order to hold the bottom central during the movement of the sections, springs 116 are secured to the bar, the springs being so constructed as to bear against surfaces 121 of the machine. The bottom 118 is normally held in horizontal position by an arm 122 secured to the bar 119 and provided with a pin or roller projecting into a guide groove 123, as shown in Figs. 2 16 and 17. The guide groove is provided with an angular portion which will shift the arm and bottom of the blow-mold, thereby causing the bottle to tilt and drop off the bottom as the blow-mold reaches its position on the end sections $b$ of the rail 78. In Figs. 15 and 16 is shown a modification of the bottom tilting means permitting the bottle to remain on the bottom and cool until the blow mold is moved toward central position for the blowing of the next blank. The guide groove 124 is provided with a V-shaped depression in which is located a two armed switch. This switch is normally held by a spring with one arm $e$ in such position that when the blow mold is moving from central position the pin on the arm 122 will pass over the part $e$ holding the bottom horizontally. When the mold is returned to central position the pin on the arm 122 will be deflected down into the V shaped depression by the part $f$ turning the bottom so that the bottle will drop off.

After the blow mold has been closed as stated, sufficient air under pressure is admitted through the port 117 to fully expand the blank. After blowing has been completed the slides 79 are shifted, moving the blow mold sections apart and bringing the rail sections $a$ into alinement with the end sections $b$. In their movements apart, projections 125 on the blow mold sections strike against fingers 126 pivotally mounted on the neck mold sections and move the latter apart, thus leaving the completed article entirely free and resting on the bottom 118 as shown in Fig. 4. The shafts 98 are now operated to shift the blow and blank mold sections the latter into central or operative position. As the blow mold sections move away from central position the projections 125 pass away from the fingers 126 permitting the neck mold sections to be closed together by their springs 104. By reference to Fig. 10 it will be noticed that the projections 125 are made of such length that neck mold sections will not be free to be moved by the springs until the bottle has been moved sufficiently far by the bottom of the blow-mold to be entirely clear of the neck molds when snapped shut by their springs. The shaft 72 is now operated in reverse direction to shift the blank mold sections together and around the lower ends of the neck mold sections.

As hereinbefore stated fluid pressure is employed for forcing glass into the blank mold for enlarging the initial opening in the upper end of the blank, for expanding the blank in the blow mold, for lowering the plunger 108, for forcing the cooling liquid through the nozzles against the ladle and for cooling the plug and plunger. Each of these operations except the cooling of the plunger is intermittent and occurs in certain predetermined relation to another step or operation of the machine and hence suitable valve mechanisms preferably operating automatically are employed for controlling the flow and duration of flow of the fluid pressure to the several parts. Suitable valve mechanisms A, B, C, etc., with their connections to the several parts are shown in Figs. 1ª, 4ª, 12 and 15. Each mechanism consists of casings 127 connected to a supply tank or pipe 128 and provided with a needle valve 129 controlling the duration of flow from the tank to the part to be operated, a hand regulated valve 130 for controlling the amount or volume of such flow and an exhaust valve 131 for permitting the escape of fluid pressure from the parts operated. The needle and exhaust valves are constructed to be seated by suitably arranged springs 132 and 133 and have their stems connected to lifting rods 134 and 135 which extend through suitable guides to operative relation to disks 136 and 137 on the shafts 138 and 139. The valve mechanism A is connected by a pipe 140 to the bowl or basin 19, and on the lifting of the needle valve of said mechanism sufficient pressure is produced in the bowl to force glass into the blank mold. The exhaust valve of said mechanism is next lifted by its disk 136 to permit of the escape of pressure from the bowl. The next operation in sequence is the lifting of the plunger 108 which is effected by lifting the needle valve of mechanism B thereby permitting fluid pressure to flow through pipe 141 to the cylinder 115. As before stated the upward movement of the plunger uncovers the port 117 so that on the lifting of the needle valve of mechanism C a sufficient puff of fluid pressure will flow through pipe 142 to and through port 117 to enlarge the initial opening formed in the upper end of the blank.

The blank having been inclosed in the blow mold the needle valve of mechanism D is raised permitting sufficient flow of fluid pressure through pipe 143 to and through port 117 to completely expand the blank after which the exhaust valve is opened. After the blow mold has been shifted from central position and the neck molds closed, the exhaust valve mechanism B is opened permitting of the escape of fluid pressure from one end of the cylinder 115 and the controlling valve of mechanism E is opened permitting pressure to flow to the opposite end of the cylinder through the pipe 144. The valve mechanism F is connected by pipe 52 to the tank 50 containing the liquid with which the ladle is sprayed on its way to the furnace. The operation of the needle and exhaust valves of this mechanism are timed relative to the movements of the ladle.

The machine thus far described is what is termed a single unit machine i. e. a machine having one blank mold and one blow mold. In this style of machine the ladle is necessarily idle for a considerable length of time or is moved slower than is desirable in view of the fact that a plurality of units can be fed by a common ladle. In Figs. 4, 4ª is shown a machine consisting of a plurality (in the present instance three) units X, Y and Z. Each of these units is as regards the blank and blow molds and their operating mechanisms, identical with the corresponding parts of the single unit machine hereinbefore described. As shown the units are arranged in tandem one behind the other, the central points where the several shaping operations are effected, being in the same vertical plane as that in which the ladle moves to and from the furnace. As the ladle contains a quantity of glass only a little in excess of that required to form one article, it must be emptied after each unit is charged and refilled to supply the next unit. And as the units Y and Z are farther from the furnace than the unit X, the length of stroke or movement of the ladle is changed at every reciprocation and in order that the time required for supplying the units may be the same or approximately the same, provision is made for accelerating the movements of the ladle when supplying the more distant units. These ends are accomplished in part by making the frame 6, carrying the slides 4 and 5 movable on the bed plate. The mechanism for shifting this frame is so constructed and timed that when the slides are operated as hereinbefore described to carry glass to the blank mold of unit X and to return to the furnace for a second charge, the frame 6 is stationary. But when the full ladle is being moved back to the second unit Y, the frame 6 is also moved back a distance equal to the distance between the central positions of the unit X and unit Y, so that while the slides do not move on the frame 6 any greater distance than when supplying unit X, they and the ladle will move a greater distance from the furnace. By operating its shifting mechanism at a suitable speed the frame 6 is given its entire movement while the slides are moved back their normal distance and hence no longer time is required to supply unit Y than the first unit. The same is true as regards the return of the ladle to the furnace for a third charge, the frame 6 being reversed and moved in the same direction as the slides. This frame 6 is reciprocated back and forth by any suitable means but preferably by a threaded shaft 145. As this shaft and the shaft 8 for operating the upper slide, are, except when the first station is being supplied, moved simultaneously it is preferred to operate the shaft 145 from the shaft 8 which is provided with a pinion 146 intermeshing with a pinion 147 loosely mounted on the shaft 145. The pinion is operatively connected to the shaft 145 by a clutch mechanism 148, its movable member being operated at suitable intervals as hereinafter described.

In the single unit construction the shaft 8 is threaded and engages a threaded opening in a lug on slide 5. But in the multiple unit machine provision is made for operating the slides while being moved by the frame 6 without unduly increasing the rotation of the feed shaft. This is effected by making the shaft 8 plain or unthreaded and mounting thereon an externally threaded sleeve or tube 149 which is so keyed to the shaft as to be rotated thereby although free to move along it as shown in Fig. 5. The shaft 8 is provided with a sprocket wheel which is operatively connected by a chain 150 with a corresponding wheel on the shaft 151. On the opposite end of this shaft is keyed a gear wheel 153, which intermeshes with a pinion 154, keyed to a short shaft mounted in arms 155, 155ᵃ, one of which is loosely mounted on the shaft 151, and the other keyed to shaft 152, as shown in Fig. 7. A second pinion 154ᵃ is keyed to the same shaft as the pinion 154 and intermeshes with a gear wheel loosely mounted on a hub formed in the arm 155ᵃ. These arms and the pinions 154 and 154ᵃ are carried around the gear wheel 153 by the shaft 152, but the rate of rotation of the gear wheel 153, and its shaft 151 will depend upon rate of rotation imparted the pinions by the gear wheel engaging the pinion 154ᵃ. This gear wheel is driven by a gear wheel 163 keyed on a sleeve 165 loosely mounted on the shaft 161. This sleeve is driven by the shaft 152 through speed-reducing gearing 166, which includes as parts thereof elliptical gears 164, as shown in Figs. 7 and 8, while the movement of the arms 155, 155ᵃ around shaft 151, and the rate of rotation of the gear wheel mounted on the hub of one of said arms is the same, the shaft 151 will rotate in unison with shaft 152, but as the rate of rotation of the gear wheel 163 is varied by the elliptical gears a corresponding change is effected in the rotation of the shaft 151 and consequently in the movements of the frame 6 and slides 4 and 5.

A sleeve 156 is loosely mounted on the shaft 152 and is adapted to be connected to the shaft by a clutch mechanism 157, the movable member of which is operated as hereinafter described. On the sleeve 156 two pinions 158 and 159 are loosely mounted and are adapted to be locked alternately to the sleeve by the movable member 160 of a double clutch mechanism. These pinions engage corresponding pinions on the drive shaft 161, one directly and the other through an idler 162 in order that the direction of rotation of the shaft 152 may be reversed by shifting the clutch member 160.

On the main drive shaft 161 is keyed a pinion 167 by which is driven, through suitable reducing gearing 168, the shaft carrying the drum 169 provided with cam grooves. Into one of these grooves projects the bent end of a rod 170 extending to a lever 171 having its opposite end in engagement with the movable member of clutch 157 whereby the sleeve 156 is connected to the shaft 152. A rod 172 has one end engaging another groove in the drum 169. On the opposite end of this rod are secured abutments or collars 173 and springs 174 are interposed between these collars and the ends of a loosely mounted sleeve 175 to which is connected one end of a lever 176 having its opposite end in engagement with the clutch member 160. On standards 177 which serve as guides for the rod 172 are mounted dogs 178 provided with projections which will engage opposite ends of the sleeve thereby preventing any movement of the sleeve with the rod until one or the other of the dogs has been tripped by one of the collars engaging a cam projection 179 on the dogs. By this construction the springs are placed under considerable compression so that when the dogs are tripped the clutch member 160 will be snapped from one position to the other. Into the third groove in the drum 169 extends a pin on one arm of a bell crank lever 180 having its opposite arms connected to a rod 181 which is operatively connected to a lever 182 for shifting clutch 148 in the manner described in connection with the means for operating clutch 160.

From the foregoing it will be understood that the drum 180 is constantly rotating and that at the proper time, *i. e.*, when the ladle is in the furnace or in position under one of the shaping units, the clutch 157 will be opened so as to stop the movement of the frame 6 and the slides 4 and 5, while the ladle is being filled or the glass being forced therefrom into a blank mold. During both of these periods of rest the clutch 160 is reversed so that when clutch 157 is again thrown in, the frame and slides will be moved in proper direction. Clutch 148 is held open while the blank mold of the first unit is being charged and the ladle returned to the furnace and is then closed so that thereafter until the second and third units have been served the frame as well as the slides 4 and 5 will be operated.

Each of the units is complete as regards molds etc. and their operating mechanisms. It is preferred that each unit should be arranged on a higher level than the preceding one as clearly shown in Fig. 4 and hence it is necessary to lift the ladle higher for each succeeding unit. The bowl lifting mechanism consisting of drums 27 and 28 bands 29, 30, and slides 20, 23 which are carried by the frame 6, are given sufficient movement to raise the bowl to the highest blank mold and for the lower molds the springs 36 and 37 are placed under greater tension. In other words the shaft 34 is given a constant rotation and for the lower units the excess movement is compensated for by the springs.

As hereinbefore stated the blade 75 for severing the glass in unit X is operated by shaft 72 through suitable interposed mechanism. For operating the cutting mechanisms of the other shaping units tubular shafts 183 and 184 are arranged on the shaft 72 the several shafts however being capable of independent rotation, for which purpose sprocket wheels 185 on said shafts are connected by chains to corresponding wheels 186 loosely mounted on shaft 187 but adapted to be locked to said shaft by clutches 188 which are shifted in due sequence as shown in Fig. 4ª.

The operation of the slides 79 carrying the intermediate sections a of the rails on which the blank and blow molds of unit X are mounted, is effected by eccentrics 88 on shaft 89. For the operation of the corresponding slides of shaping units Y and Z, tubular shafts 189 and 190 are mounted, one on shaft 89 and the other on the first tubular shaft and on these tubular shafts are secured eccentrics 191 and 192 for operating the slides 79 of units Y, Z etc. as shown in Figs. 4, 4ª. On the mold opening and closing shafts 189 and 190 are secured sprocket wheels 193 which are driven through chains by corresponding wheels 194 on shaft 187. The wheels 194 are loosely mounted on said shaft but are adapted to be locked to the shaft in proper sequence by clutches 196 on shaft 187.

The shifting on the blank and blow molds to and from central or operative position in unit X is effected by drums 96 on shafts 98. Drums 197 and 198 connected by bands to the mold shifting bars 90 and 91 of units Y and Z are secured on tubular shafts 199 and 200 surrounding shafts 98. The pairs of shafts 98, 199 and 200 are caused to rotate in unison by means of sprocket chains engaging sprocket wheels 203 on the respective shafts. One of each pair of shafts 98, 199 and 200 are driven from the shaft 204 on which are loosely mounted pinions 205 having eccentrics 206 secured thereto. The straps of these eccentrics are connected to racks 207 intermeshing with pinions 208 on the shafts 98, 199 and 200 as shown in Figs. 4ª and 6. The pinions 205 on shaft 204 intermesh with pinions 209 loosely mounted on the shaft 187 but are adapted to be locked thereto in proper sequence by clutches 210. An eccentric 213 is also loosely mounted on the shaft 204 and has its strap 214 connected to a rack 215 which intermeshes with a pinion 216 on shaft 34 for operating the bowl lifting mechanism. The eccentric 213 is secured to a pinion 217 which intermeshes with a pinion 211 on shaft 187. The pinion is adapted to be locked to shaft 187 by a clutch member 219. A cushioning spring 219 forms a part of the connection between the strap 214 and the rack 215. This spring will supplement the compensating action of the springs 36 and 37 when the bowl is lifted to place the ladle in operative relation to the blank molds arranged on the lower levels as described.

It will be observed that the several shafts whereby power is transmitted to all of the mechanisms, except those involved in shifting the ladle to and from the furnace, are driven from the shaft 187 and that the mechanical elements for transmitting motion from shaft 187 to the several shafts, are normally disconnected from the shaft, and must be connected therewith in accordance the sequence of the several operations. In the construction shown this driving connection of the several shafts with the shaft 187 is effected by means of clutches as described. The shifting of the clutches 188 for the operation of the glass shearing mechanisms is effected by means of grooved cams 220 on the controlling shaft 221. The levers 222 being connected at one end to the movable members of the clutches 188 while their opposite ends are connected to the cams 220 in substantially the manner hereinbefore described whereby a quick snap of the movable member of the clutch is effected. The clutches 196 controlling the mechanism for opening and closing the molds are shifted by cams 223 on the controlling shaft 221 through the medium of levers 224. In like manner the operation of the mechanisms for shifting of the molds to and from central or operative position is controlled by cams 225 on shaft 221 through the medium of levers 226 which engage the clutches 212. The cam 227 on shaft 221 controls the clutch 219 whereby the eccentric for operating the shaft 34 of the bowl shifting mechanism, is thrown into and out of operation.

The shaft 67 whereby the ladle is rotated is connected by bevel gears 228 to a vertical shaft 229 which is oscillated by a reciprocating slide 230 as shown in Fig. 6. This slide is operated by a cam 231 on the shaft 232 which in turn is driven by the auxiliary drive shaft 233. This auxiliary shaft which is connected by reducing gearing 234 to the main drive shaft 161 as shown in Fig. 5, is connected by chains 235 and 236 to shaft 187 and controlling shaft 221.

Each of the units Y and Z has connections similar to those of the unit X to valve mechanisms G, H, I, J, K, L, which are operated in due sequence by disks 136 and 137 on shafts 138 and 139 as shown in Figs. 4ª and 6. One of these shafts as 138 is driven through a chain and sprocket wheels by the controlling shaft 221 and shaft 139 is similarly driven by shaft 138.

It will be readily understood that the blank and blow molds and neck molds can be easily and quickly removed and other molds substituted without changing the adjustment of any of the other parts of the machine except the bridge 101 carrying the neck molds and the plunger for closing the upper end of the latter, when the substituted molds vary in length from those removed. The adjustment of the bridge is effected by replacing the U shaped collars 103ª on the upright 103. It will be observed that those parts whose movements would vary with different sizes of molds, are actuated by mechanisms having springs or cushions in their connections and hence by adjusting the actuating mechanisms to give the greatest movement likely to be needed, the springs will yield and compensate for lesser movements. It is also characteristic of my improvement that not only can articles of different shapes and sizes horizontally be formed at the same time on my improved machine but also bottles differing greatly in length and this I believe an entirely novel feature in wholly automatic machinery, comprising a plurality of shaping units. This results from carrying the glass to the stationary mold and providing for an automatically variable movement of the glass carrier relative to such mold.

As will be readily understood by those skilled in the art any shifting of the blank while hanging from the neck mold free and laterally unsupported will tend to bend the upper portion of the still plastic blank. This distortion will not occur in my improved machine as the blank is not moved in any direction but is blown and shaped in the place it was formed.

It will be understood that as regards the broad features claimed as of the invention herein, the mechanisms shown and described are merely types and that such mechanisms can be readily changed and modified within wide limits by one skilled in the art without departing from the spirit of the invention. While it is preferred to use the described mechanism for conveying the glass from a receptacle and charging it into molds in connection with mold operating mechanism such as shown and described and forming the subject matter of a divisional application filed July 19, 1911, Serial No. 639,459, it will be understood that the broader claims herein are not limited to use in such connection, as other means for operating the molds will readily suggest themselves to those skilled in the art without departing from the spirit of the invention described and claimed herein.

I claim herein as my invention:

1. In a machine for manufacturing glass articles, the combination of a mold, a container for molten glass, a ladle, means for reciprocating the ladle back and forth between the mold and container and means acting on the glass for discharging the ladle into the mold.

2. In a machine for manufacturing glass articles, the combination of a mold, a container for molten glass, a ladle, means for reciprocating the ladle back and forth between the mold and container, and means for immersing the mold into the ladle and means for forcing the glass from the ladle into the mold.

3. In a machine for manufacturing glass articles, the combination of a mold, a container for molten glass, a ladle, means for reciprocating the ladle back and forth between the mold and container and means for lifting the ladle to immerse the lower end of the mold into the glass contained in the ladle, and means for forcing the glass into the mold.

4. In a machine for manufacturing glass articles the combination of a mold, a container for molten glass, a ladle, means for reciprocating the ladle back and forth between the mold and container, means for immersing the ladle in the glass and means acting on the glass for discharging the glass from the ladle into the mold.

5. In a machine for the manufacture of glass articles, the combination of a mold, a furnace, a ladle, means for reciprocating the ladle back and forth between the mold and furnace and means for inverting the ladle to discharge the same and restoring it to normal position and thereby gathering a quantity of glass.

6. In a machine for the manufacture of glass articles, the combination of a mold, a furnace, two slides, means for reciprocating said slides, a ladle carried by one of the slides and means carried by the other slide for tilting the ladle.

7. In a machine for the manufacture of glass articles, the combination of a furnace, a series of molds arranged at different distances from the furnace, a frame, slides movably mounted on the frame, independent means for reciprocating the frame and slides, a ladle carried by one of the slides and means carried by the other slide for tilting the ladle.

8. In a machine for the manufacture of glass articles, the combination of a furnace, a series of molds arranged in suitable relation to the furnace, a frame, slides movably mounted on the frame, independent means for reciprocating the frame and slides, a ladle carried by one of the slides and means carried by the other slide for tilting the ladle.

9. In a machine for the manufacture of glass articles, the combination of a furnace, a series of molds arranged at different distances from the furnace, a frame, slides movably mounted on the frame, independent and variable means for reciprocating the slides and frame, a ladle carried by one of the slides and means carried by the other slide for tilting the ladle.

10. In a machine for manufacturing glass articles, the combination of a furnace, a series of molds arranged at different distances from the furnace, a frame, slides movably mounted on the frame, independent means for reciprocating the frame and slides, a ladle carried by one of the slides, means carried by the other slide for tilting the ladle and means carried by the frame for lifting the ladle.

11. In a machine for manufacturing glass articles, the combination of a furnace, a mold, a frame, a slide movable on the frame, a ladle carried by the slide, means for independently reciprocating the frame and slide, means carried by the frame for rotating the ladle and an extensible connection from the rotating means to the ladle.

12. In a machine for the manufacture of glass articles, the combination of a series of two or more molds varying in length, a receptacle for a mass of molten glass, and mechanism automatically variable to bring into operative relation said mass of glass and said molds.

13. In a machine for the manufacture of glass articles the combination of a series of stationary molds varying in length, a receptacle for a mass of molten glass and mechanism variable to bring into operative relation said mass of glass and said molds.

14. In a machine for the manufacture of glass articles, the combination of a series of molds of different lengths and mechanisms for bringing molten glass and the molds successively into operative relation and variable in accordance with the lengths of the molds.

15. In a machine for the manufacture of glass articles, the combination of a relatively stationary neck mold, a blank mold, a blow mold, means for bringing the blank and blow molds alternately into operative relation to the neck mold, a ladle for supplying glass to the blank mold and means for reciprocating the ladle in a plane at right angles to the direction of movement of the blank and blow molds.

16. In a machine for the manufacture of glass articles, the combination of a relatively stationary neck mold, a blank mold, a blow mold, means for shifting said blank and blow molds alternately into operative relation to the neck mold, a ladle for supplying glass to the blank mold, and means for reciprocating the ladle horizontally and vertically in a plane substantially at right angles to the direction of movement of the blank and blow molds.

17. In a machine for the manufacture of glass articles, the combination of a furnace, a series of glass shaping units arranged in tandem relative to the furnace, a ladle for supplying glass to said units and means for moving the ladle from the furnace to each of the units in succession.

18. In a machine for the manufacture of glass articles, the combination of a furnace, a series of two or more glass shaping units arranged in tandem and in different horizontal planes relative to the furnace, a ladle for supplying glass to said units, means for reciprocating the ladle horizontally and vertically with reference to the units, and means for automatically varying the movement of the ladle after each reciprocation.

In testimony whereof, I have hereunto set my hand.

CHARLES C. STUTZ.

Witnesses:
ALICE A. TRILL,
THOMAS JOYCE.